US007717034B2

(12) United States Patent
Madgar

(10) Patent No.: US 7,717,034 B2
(45) Date of Patent: May 18, 2010

(54) PALLET NAIL PRESS AND METHOD

(75) Inventor: Adam J. Madgar, Cortland, OH (US)

(73) Assignee: Millwood, Inc., Girard, OH (US)

( * ) Notice: Subject to any disclaimer, the term of this patent is extended or adjusted under 35 U.S.C. 154(b) by 300 days.

(21) Appl. No.: 11/809,673

(22) Filed: Jun. 1, 2007

(65) Prior Publication Data

US 2008/0295708 A1 Dec. 4, 2008

(51) Int. Cl.
*B30B 13/00* (2006.01)
*B23P 19/02* (2006.01)

(52) U.S. Cl. ......................... 100/35; 100/219; 100/226; 100/269.04; 29/432; 29/714; 29/772; 29/822

(58) Field of Classification Search ................. 100/226, 100/265, 269.02, 269.03, 269.04, 913, 35, 100/219; 29/238, 252, 402.01, 432, 714, 29/772, 822
See application file for complete search history.

(56) References Cited

U.S. PATENT DOCUMENTS 3,376,808 A 4/1968 Beckett et al.
3,557,439 A 1/1971 Dykeman
3,823,861 A 7/1974 Jureit et al.
3,908,885 A 9/1975 Scott
4,429,629 A 2/1984 Leonard
4,669,184 A 6/1987 Castillo
4,998,336 A 3/1991 Papsdorf
5,285,720 A 2/1994 Wright
5,375,315 A 12/1994 Griffith et al.
5,547,002 A 8/1996 Runnebaum
5,555,617 A * 9/1996 Pope ........................... 29/772
6,032,351 A 3/2000 Beane
6,763,564 B2 7/2004 Iles
6,829,822 B1 12/2004 Minick

FOREIGN PATENT DOCUMENTS

AU 9215057 2/1994

* cited by examiner

*Primary Examiner*—Jimmy T Nguyen
(74) *Attorney, Agent, or Firm*—Robert J. Herberger

(57) ABSTRACT

A pallet nail press for embedding outwardly extended fasteners of a pallet, particularly a block-type pallet having a top surface formed by a plurality of top-deck panels. The press includes a main support frame and an anvil surface having a plurality of plates resiliently attached to the press frame. The hammer beam and the anvil plates are vertically aligned. A mechanism for compressing the pallet between the hammer beam and the plurality of anvil plates is used for pressing the outwardly extended fasteners against the resiliently mounted anvil plates for embedding the fasteners in the top surface of the top-deck panels of the pallet.

18 Claims, 10 Drawing Sheets

PALLET NAIL PRESS AND METHOD

FIELD OF THE INVENTION

The present invention relates to the repair or assembly of pallets, especially block-type pallets, and more particularly, a nail press and method for driving and embedding nails or other fasteners extending from a top surface of each pallet.

BACKGROUND OF THE INVENTION

Pallets are used frequently in shipping goods and are normally constructed of an upper tier of deck panels. More specifically, a typical pallet is constructed by nailing a series of deck panels to a supporting base. The deck panels form a load support surface upon which goods to be transported are placed.

Such pallets are generally of two types: block-type P1 and stringer-type P2 pallets. A representative stringer-type configuration is seen in accompanying FIG. 1D. The stringer-type pallet P2 includes three-spaced, parallel support members along the pallet length to which upper, and possibly lower deck panels are nailed perpendicular or widthwise. Stringer-type pallets utilize rectangular stringers or runners that run the full length of the pallet. The top-deck is fastened to the upper-most surface or top of the stringers. For double-face pallets, the bottom deck is fastened to the bottom surface of the stringers. Since the height of the rectangular stringers are three inches or more, top-deck panels are typically fastened very securely to the stringer using relatively long nails.

A standard block-type pallet P1, on the other hand, employs a number of relatively small, rectangular-spaced blocks onto which three-spaced, parallel stringer boards, typically about $\frac{3}{4}^{th}$-inch thick, are attached lengthwise. A representative block-type configuration is seen in accompanying FIG. 1A. Upper and lower deck panels are fastened, typically nailed perpendicular to the aforementioned stringer boards widthwise to the pallet proper. The upper deck panels are generally indexed T1 through T4 from front or lead-end to the rear-most pallet end, i.e. along the pallet length. Specifically, the lead top-deck panel is identified as T1. The next panel in sequence is T2, followed by two T3 deck panels, then a T4 panel positioned over the three center blocks, two perimeter center blocks B2 and one in the middle or center of the pallet BC. Continuing in sequential order, there are two more T3 panels followed by another T2 and finally, another T1 panel at the rear-most pallet end. It is important to note that the lead and rear-most T1 panels of each block-type pallet are positioned over the end blocks B1 at each pallet corner and a center block B2 therebetween. The adjacent T2 panels are divided with about half of each panel width positioned over the same end blocks as their neighboring T1 panel. In many instances, the T1 and T2 panels are in direct abutting contact along the pallet width. The T3 panels, by contrast, only fasten to the thinner stringer boards SL, SM and SR between pallet end and center blocks. For structural strength, T1 and T4 panels are usually made from hardwood, such as red or white oak for structural strength, while T2 and T3 panels are typically cut from a soft pine. As a result, the T3 deck panels are more prone to work their way loose over time due to the softer wood and shorter nails used to attach the same to the thinner stringer boards.

Also, it is important to note that the spaces between blocks and stringer boards of a block-type pallet P1 or between stringers of a stringer-type pallet P2 are adapted to receive the tines of conventional forklift trucks. In the course of being moved from place to place with the forklift, these pallets become damaged. Particularly, T1 panels are often hit with the nose of the forks. Although T1 panels are usually made from harder wood, after repeated use, the nails used to fasten the T1 deck panels work loose, particularly if improperly lifted. Also, T1 panels are more prone to be partially or completely broke if the forks are not properly positioned before lifting. If these problems are not corrected, the random, upstanding nails and broken panels will damage the goods loaded and/or removed from these pallets. Although the difference in board thicknesses and nail-to-board height difference may seem relatively small, it often causes substantial property damage and loss by tearing or scratching the packaging, goods and/or equipment stacked on the pallet.

As a result of its configuration and construction, during repair or furbishing of block-type pallets P2, a problem often arises if a T1, or even T4 panel is replaced with a board not fully cured. Specifically, the width of the T1 panel is about $\frac{3}{4}^{th}$-inch thick when freshly cut. After curing, that same panel typically shrinks in thickness to about $\frac{11}{16}^{th}$-inch. Therefore, if a T1 panel is replaced with another not fully cured, it is often slightly thicker than the other deck panels. Also, a replacement panel may be accidentally cut thicker or thinner than standard board thicknesses. Whatever the reason, it has been found that this replacement board-thickness difference often causes a serious problem. That replacement board thickness difference is shown, for example, by spacing $d_2$ in accompanying FIG. 1C. Also note, FIG. 1C shows a nail that has worked loose and extends above the pallet surface prior to pressing according to the invention. The nail-above-board spacing is shown as $d_1$.

While more pronounced with block-type pallets, the problem of raised or extended fasteners and replacement board thickness differences also occurs with stringer-type pallets.

When pallets having the problems described are being furbished and passed through a pallet nail press such as that described in U.S. Pat. No. 5,375,315, the top anvil may hit the top surface of each T1 and T4 panels, but, if a T1 panel, for example, is thicker than the other deck panels for the reasons stated, that same anvil will never completely contact the top surface of adjacent, and relatively lower, T2 and T3 panels. Since they are made of hardwood, these T1 and T4 panels are less forgiving and compress only slightly as compared to the adjacent T2 and T3 panels made from relatively softer woods. As a result, nails extending above the surface of the thinner panels are not rendered flush with the pallet top surface, as should be the case after passing through the nail press. Also, if one of the stringer boards SL, SM or SR is slightly bowed downward between blocks, a new replacement T1 or T4 panel may extend even higher above its nearby T2 and T3 panels, further exacerbating the problem of varying nail heights above the pallet top surface after compression with a nail press.

Notably, with existing, automated pallet nail presses, it is difficult to adjust the compression force in the press to contact these lower areas across the pallet upper surface. If too much compression is applied to force complete press-to-pallet contact, damage to the thicker areas of the pallet and/or blocks therebeneath occurs.

In the field of pallet manufacturing, automation is known, as seen for example in the automatic apparatus and methods of Buck U.S. Pat. Nos. 6,736,591 and 6,430,800, or the earlier apparatus of Pope's U.S. Pat. No. 5,555,617. There are also known methods and equipment for removing components to pallets such as the board and stringer removal apparatus of Minick's U.S. Pat. No. 6,829,822 and Beane's U.S. Pat. No. 6,032,351. For lumber related applications, Runnebaum's U.S. Pat. No. 5,547,002 discloses a variety of framed press machinery. And, in a completely different context, Ilies' U.S. Pat. No. 6,763,564 teaches a method and apparatus for driving fasteners into an electric fan assembly. But, none of the foregoing addressed automating pallet furbishing, particularly the driving of fasteners into block-type pallet upper surfaces, as well as their stringer design counterparts having a less than planar top or uppermost surface.

For these and other reasons, it is an objective of this invention to address the aforementioned pallet repair shortcomings and provide a more universal, dynamic nail press and method that will accommodate varying panel thicknesses, bowing, warping, and other imperfections for pressing down all fasteners that otherwise extend above its uppermost surface. The preferred press described herein for embedding outwardly extended or loosened nails and other fasteners, includes a press having an anvil with a plurality of anvil plates resiliently attached to a frame with a hammer beam movably positioned in a vertical space alignment with the several anvil plates. A drive is used for advancing the hammer beam sufficiently away from a conveyor system and preferably toward the anvil plates for compressing the top-deck panels therebetween to more completely embed into the pallet upper panels any extended fasteners. Alternately, if the pallet is sufficiently separated from the underlying conveyor, the resiliently attached anvil plates can be lowered down and over the pallet proper for embedding any and all raised fasteners from the pallet's uppermost surface.

For this and other reasons, this invention represents a significant advantage over other automated machines, even the pallet nail press and method of Griffith, et al., U.S. Pat. No. 5,375,315.

SUMMARY OF THE INVENTION

An object of the present invention is to provide a pallet nail press that quickly, yet easily and efficiently engages the whole top surface of a pallet's upper panel deck with sufficient force to embed any and all raised fasteners without damaging the panels comprising that upper deck and/or the pallets structural integrity.

Another object of the invention is to provide a press that easily adjusts to pallet imperfections often encountered with repairing pallets, especially block-type pallets.

A still further objection of the invention is to provide a press that can accommodate pallet panels of varying wood types, thicknesses, shapes and styles.

To achieve the foregoing and other objects and in accordance with the purpose of the invention embodied and broadly described herein, an embodiment of the invention preferably includes a pallet nail press having a main support frame with an anvil having a plurality of anvil plates resiliently attached. A hammer beam is movably positioned within said frame in a substantially vertical space alignment with the plurality of anvil plates. That hammer beam is driven by a mechanism for advancing the beam linearly toward said anvil plates, preferably by raising the pallet. There, the pallet top-deck panels will be pressed against the resiliently attached plates of the anvil to more completely and effectively embed nails or fasteners.

These and other features, aspects and advantages of the present invention will become better understood with reference to the following description and appended claims.

BRIEF DESCRIPTION OF THE DRAWINGS

To describe the present preferred embodiment of the invention, reference shall be made to accompanying drawings in which.

DETAILED DESCRIPTION OF PREFERRED EMBODIMENTS

Figure 1A:
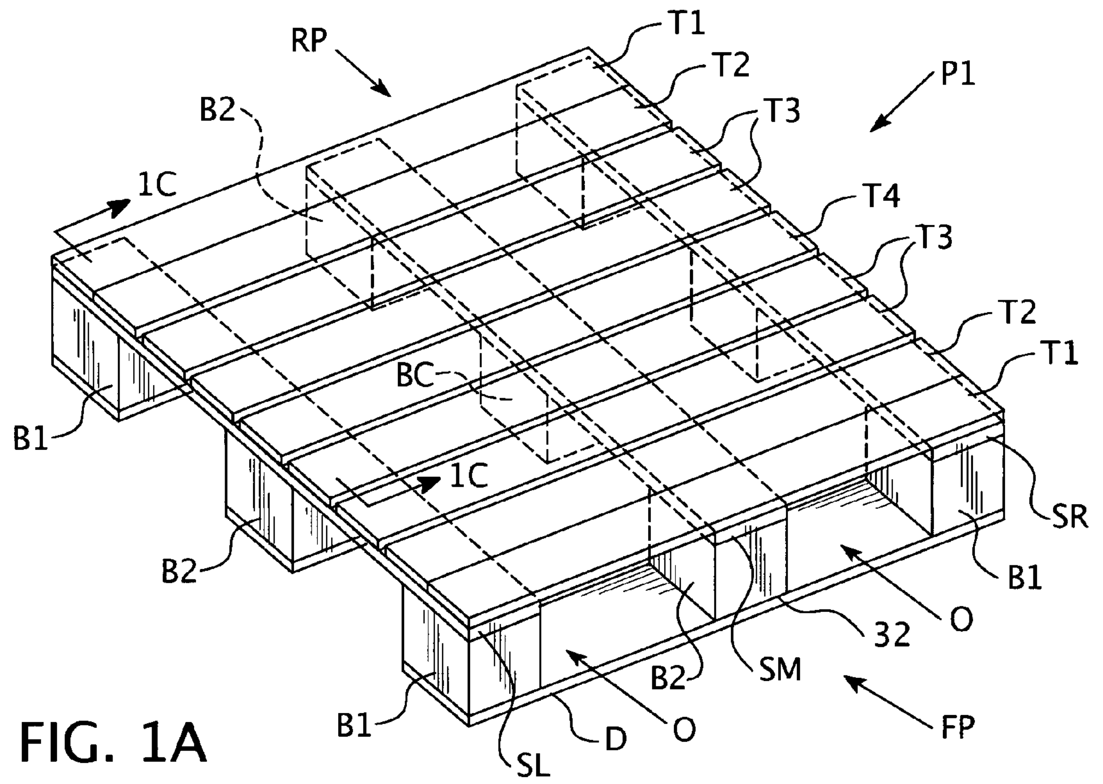
FIG. 1A is a perspective view of a typical block-type pallet.
Figure 1B:
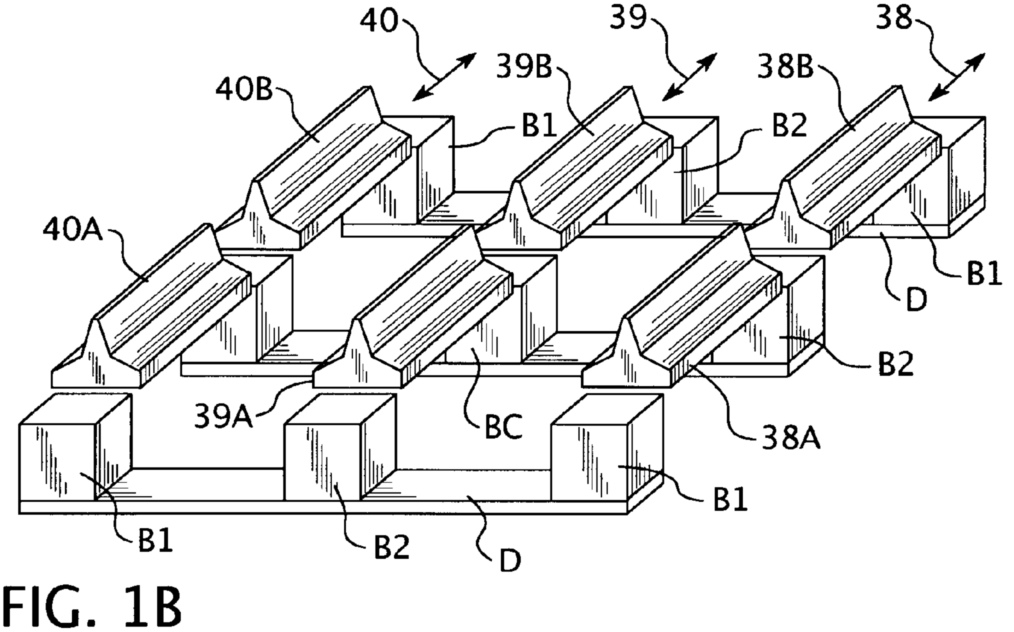
FIG. 1B is a perspective illustration of the longitudinally-aligned and spaced blocks B1, B2 and BC, that are typically positioned beneath the top-deck panels (removed herein from the FIG. 1A pallet), and shown with a plurality of resilient anvil plates of this invention situated over and between adjacent, longitudinally aligned block pairs.
Figure 1C:
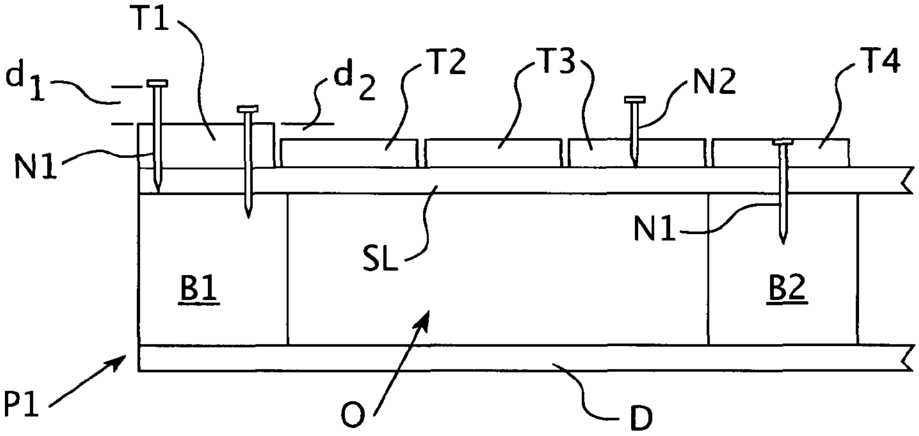
FIG. 1C is a partial side view of a block-type pallet taken along lines 1C-1C of FIG. 1A, having extended nails and board height differences that often occur when select deck panels are replaced with uncured wood.
Figure 6A:
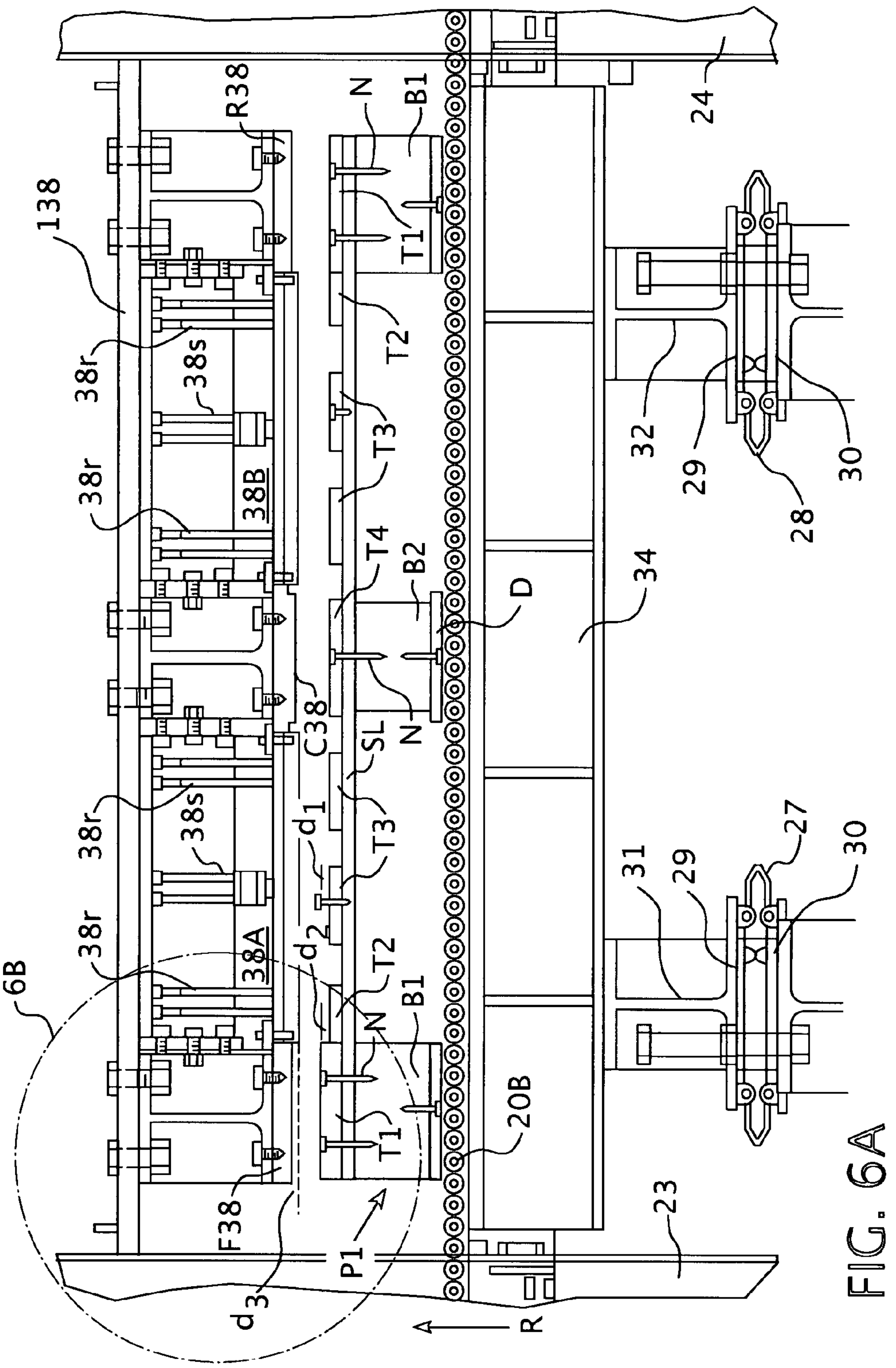
FIG. 6A is a cross-sectional view of the nail press taken along lines 6A-6A in FIG. 4, shown with a block-type pallet therein before activation of compression.
Figure 6B:
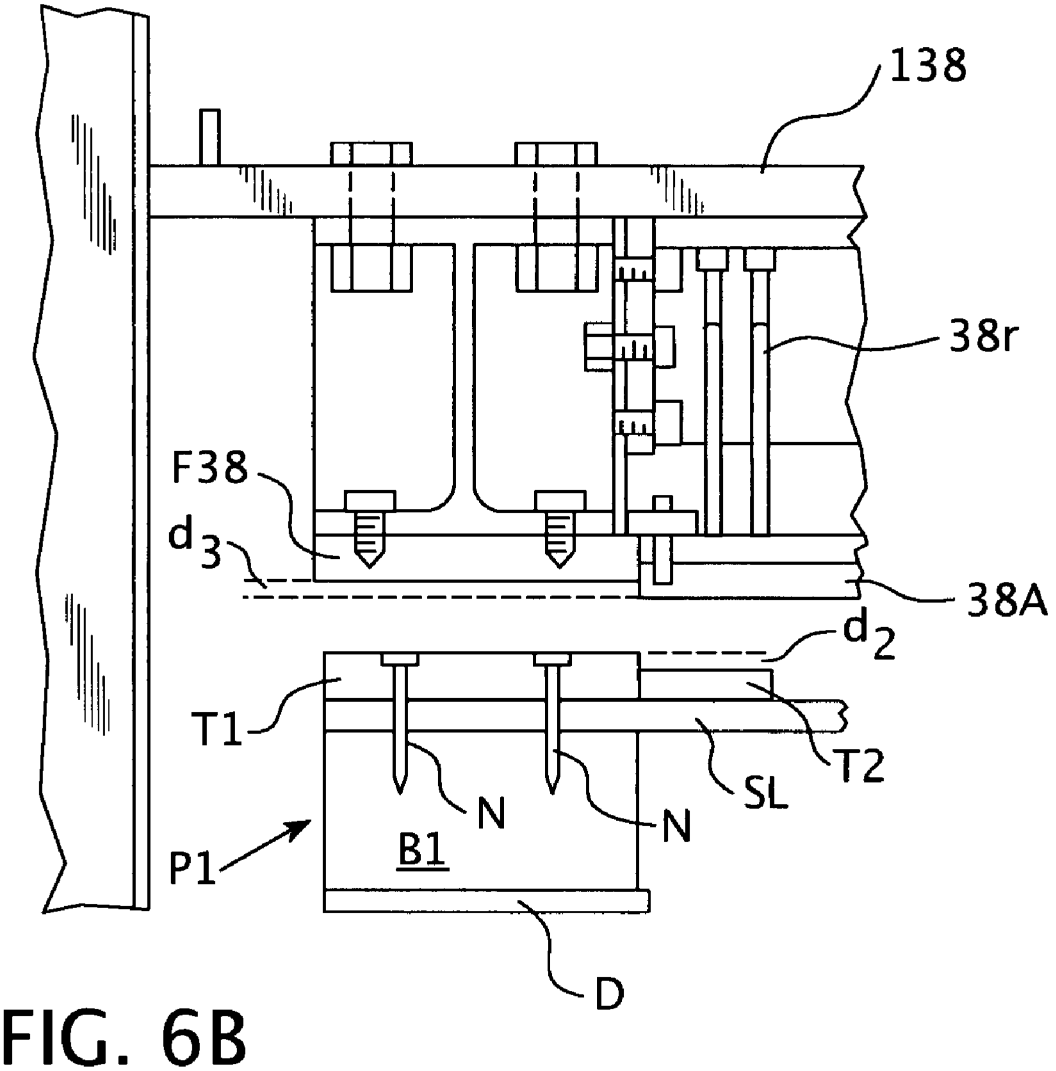
FIG. 6B is sectional view of the identified portion of FIG. 6A.

Referring first to FIGS. 1A and 1B, there is shown a representative block-type pallet P1. It consists of four corner or end blocks B1 with a block B2 midway between each end block pairing. The block in the center of the pallet, shown with dotted lines and identified as BC, is located between blocks B2. In combination, these blocks B1, B2 and BC form three sets of longitudinally aligned blocks, better seen in accompanying FIG. 1B with resilient anvil plates drawn therebetween and over, and otherwise beneath an underlayment of top pallet panel and stringer boards (removed from FIG. 2 for illustration purposes). More specifically, in FIG. 1, relatively thin connector or stringer boards SL, SM and SR each join three blocks along the pallet length at both ends and the pallet middle. A series of widthwise deck boards are then fastened with nails (items N in FIGS. 6A, 6B and 7, and more specifically identified as N1 and N2 in FIG. 1C) to the left SL, middle SM and right SR stringer boards.

As described earlier, the upper deck panels are generally referred to as T1 panels along the pallet widths at both the front FP and rear RP ends of the pallet P1. Often immediately adjacent, and sometimes in contact with each end deck panel T1 is an internal deck panel, each designated T2, that extend at least partially over the end blocks B1 beneath stringer boards SL and SR, and over the center block B2 with its corresponding stringer SM.

In almost all cases, bottommost pallet boards D connect the lower sections to the end and center blocks, i.e. B1-B2-B1, B2-BC-B2 and B1-B2-B1, respectively, for structural integrity. When completed, the foregoing arrangement forms a pair of forklift openings O into which tines of a lift machine may be guided to raise and lower the load of goods and/or equipment situated on the pallet.

As described above, FIG. 1C shows for illustration purposes the relative thickness difference that may be observed with a block-type pallet when one or more top surface panels have been replaced. More specifically, the measured thickness difference indicated by spacing $d_2$ is the gap observed when a non-heat treated or uncured replacement panel, like new T1 in that Figure, is used to repair a damaged T1 panel. Further, in FIG. 1C, the relative distance of an exposed fastener or nail above the top planar surface of a top-deck panel of a pallet is also indicated as $d_1$. It should be noted that a block-type pallet typically employs two different sizes of nails/fasteners: a first, longer nail N1 is used to attach the top panels T1, T4 and a portion of T2, to the corresponding blocks of the pallet proper; while a relatively shorter nail N2 is used for attaching panels T3 and the remaining portion of T2 where the panels have no underlying block support. Should longer nails be used on the latter pallet panels, they would tend to extend through the bottom of the longitudinal boards they are intended to secure to the pallet. Unfortunately, because they have less underlying support, the shorter nails are more likely to work their way loose over time and have at least some portion of nail head and stem extending above the upper pallet surface.

The other, longer nails can also work their way out of their respective fastener holes and rise ever so slightly above the pallet top. It is preferred, therefore, that a pallet being readied for first use, or for reuse after repair or refurbishing, have all of its fasteners pressed down into the uppermost surface of the deck panels. While distance $d_1$ can vary depending on the extent to which a fastener rises above the pallet upper plane, a pallet nail press is needed that can accommodate different pallet deck panel thicknesses and/or different nail corrective heights.

Figure 1D:
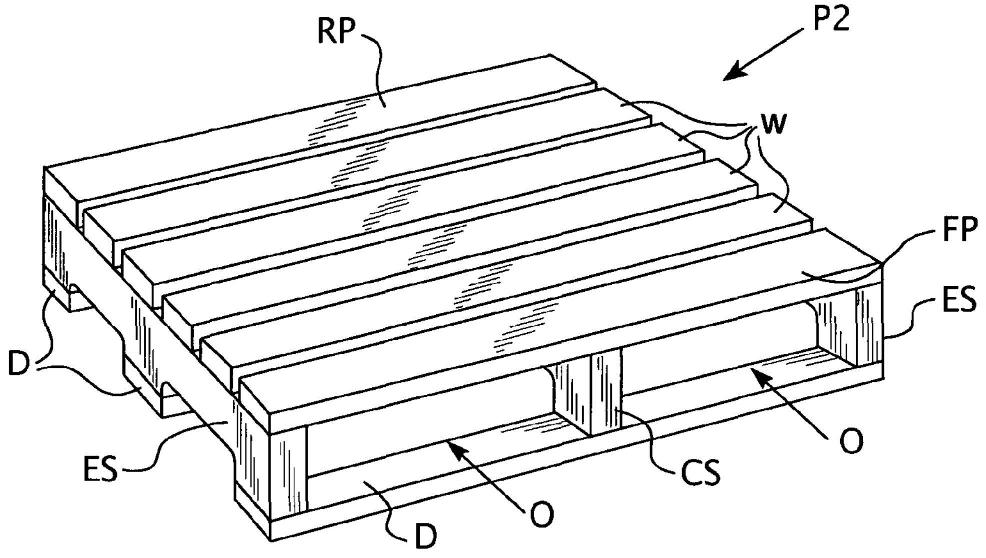
FIG. 1D is a perspective view of a typical stringer-type pallet.
Figure 2:
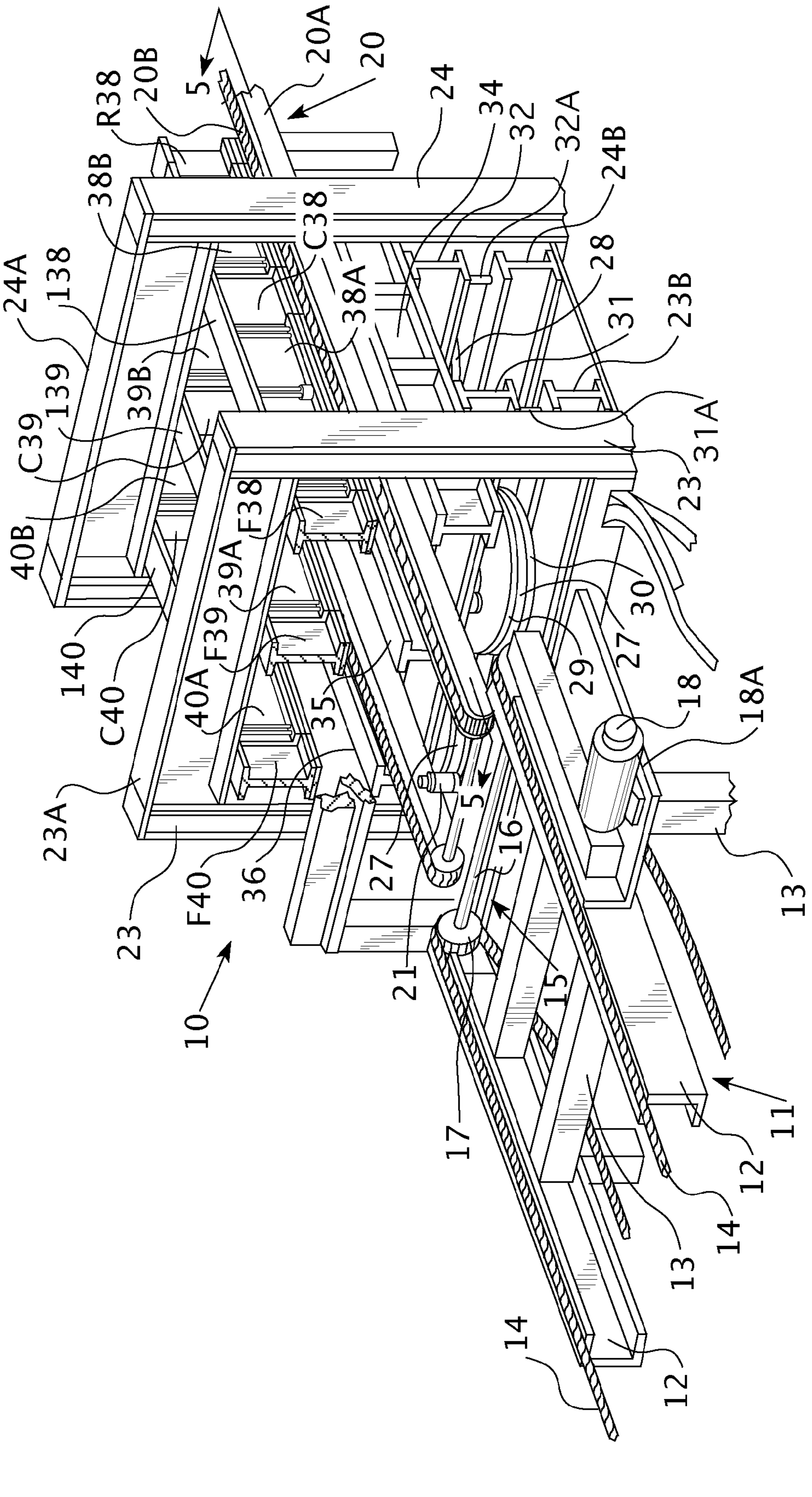
FIG. 2 is a perspective view of the pallet nail press of this invention having a conveyor passing therethrough.
Figure 3:
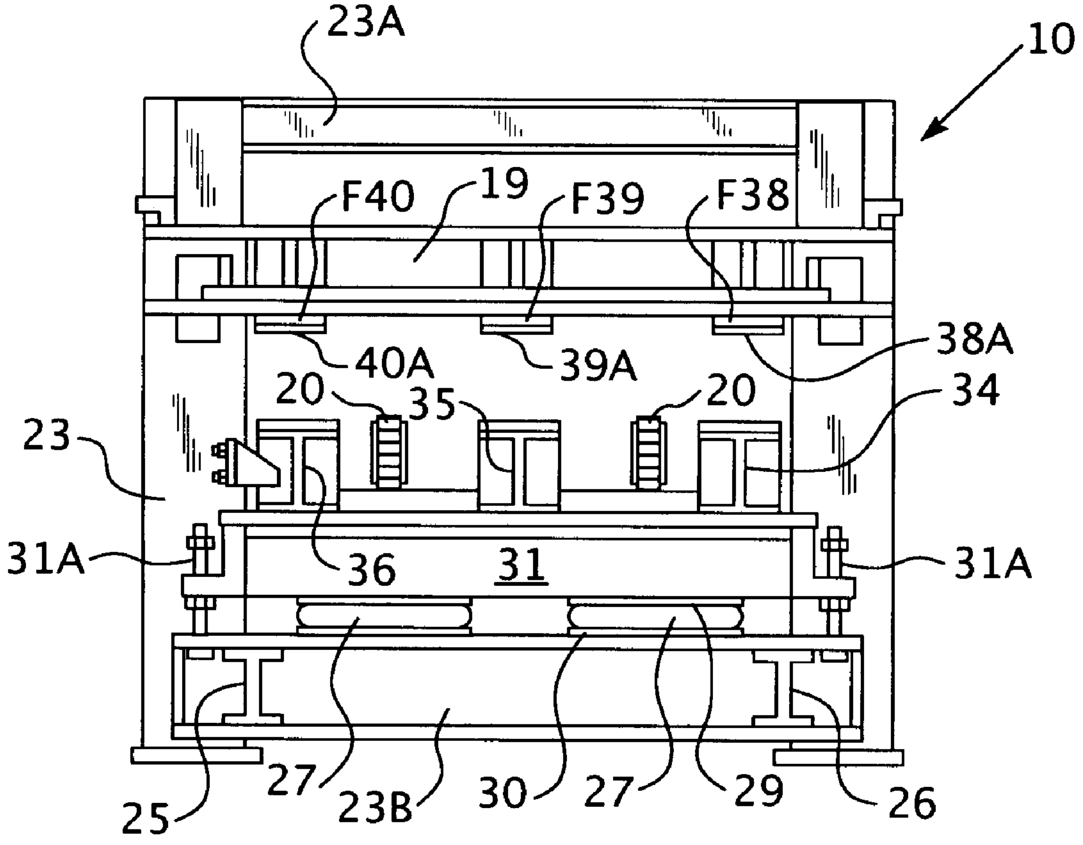
FIG. 3 is a front, elevational view of the nail press according to FIG. 2.
Figure 4:
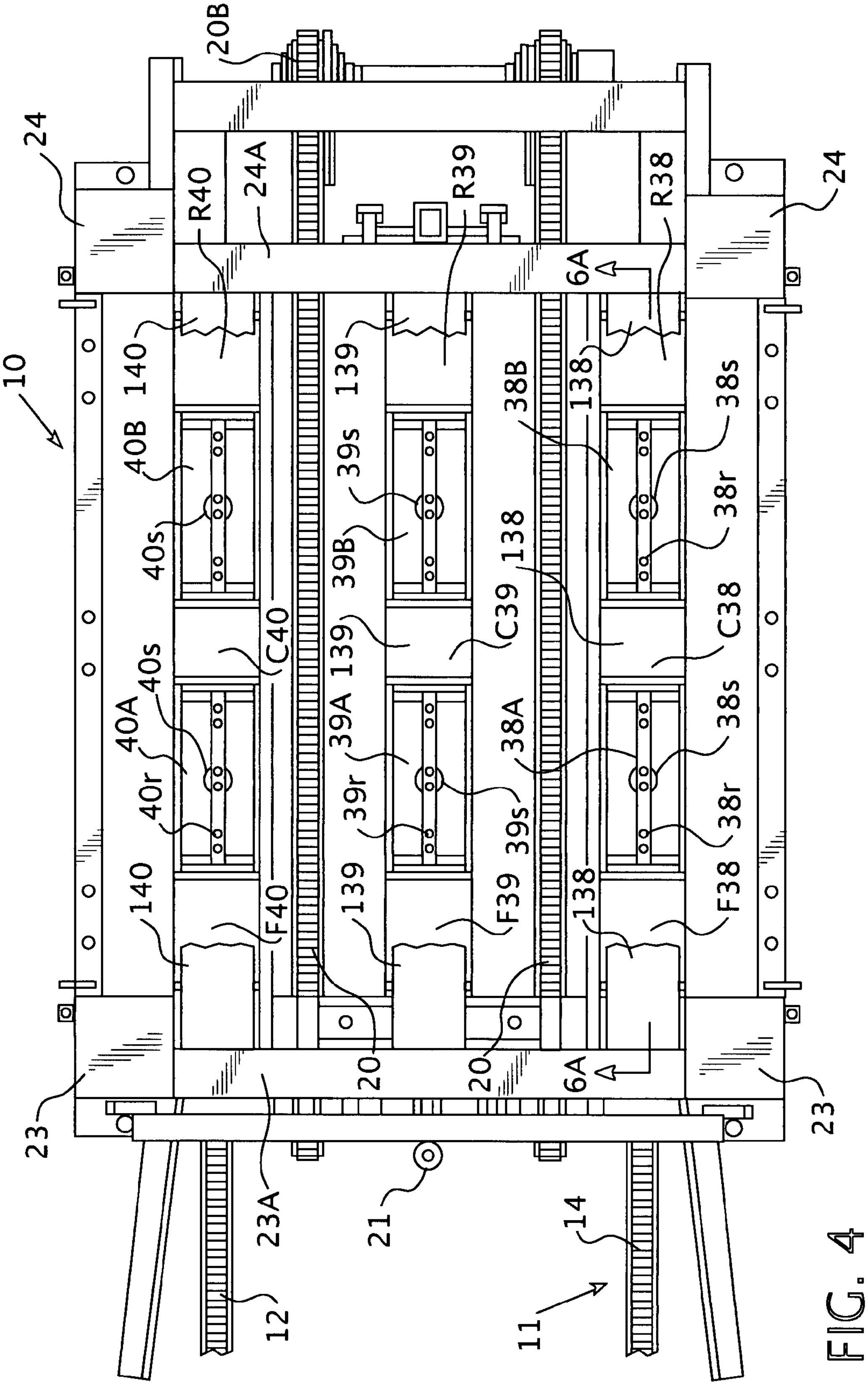
FIG. 4 is a plan view of the nail press according to FIG. 2 with a portion of the anvil support member cutaway for viewing components therebelow.
Figure 5:
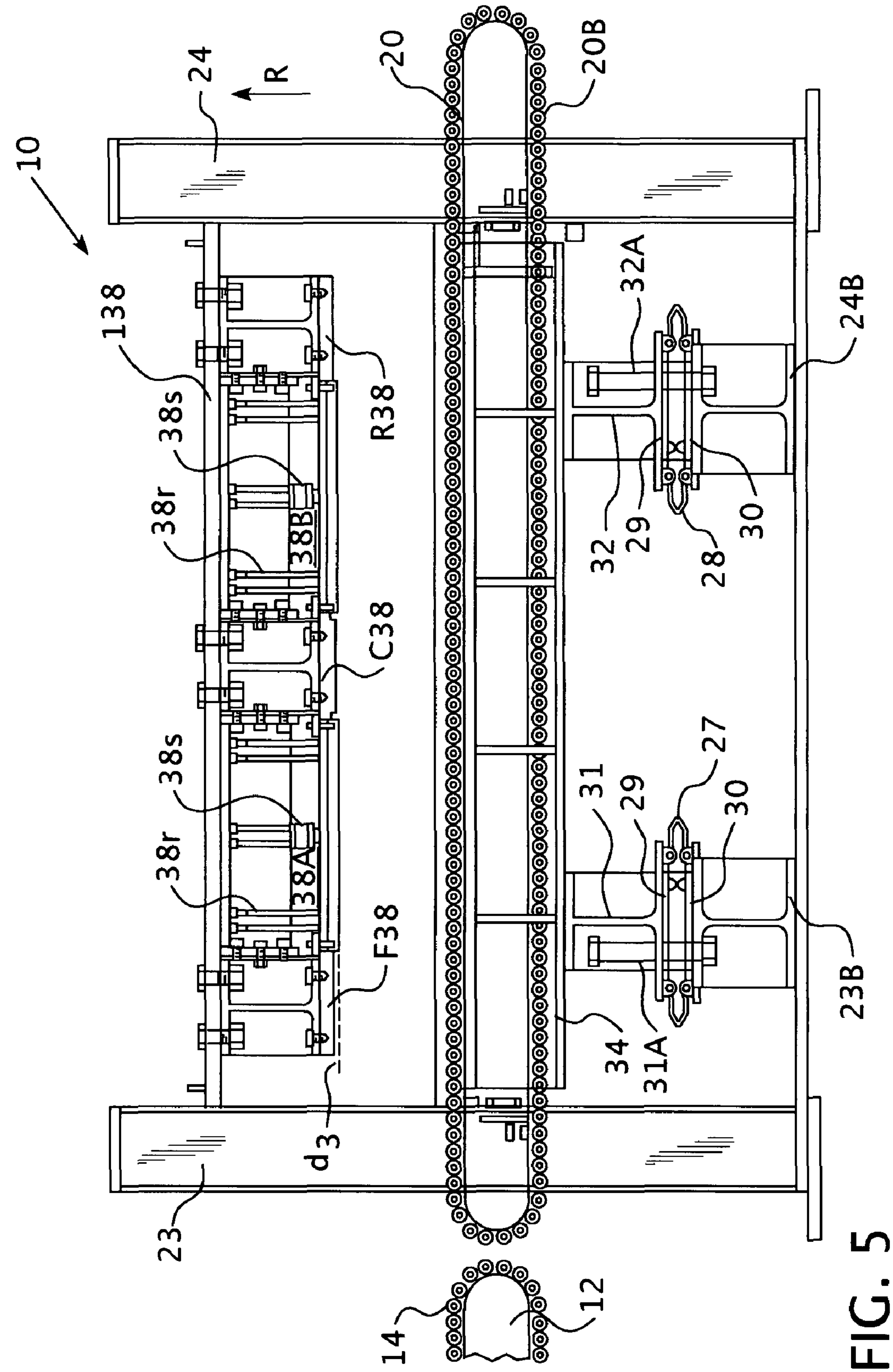
FIG. 5 is a cross-sectional side view of the nail press of FIG. 2 taken along lines 5-5.

FIG. 1D shows the alternative, stringer-type pallet P2. In that standard configuration, there are two end stringer boards ES and a central stringer board CS that run along the length of pallet P2, serving somewhat the same role as blocks and overlying stringer boards from the above block-type pallet design. Front and rear panels, FP and RP, respectively, along with a plurality of widthwise deck panels W therebetween, connect directly across the lengthwise stringer boards ES-CS-ES, creating an upper pallet surface onto which goods and/or equipment is loaded for transport. Bottom deck boards D run along the base of the stringer boards at, at least the outer ends to same for structural support. The space between the stringer boards in this configuration produce the forklift openings O by which the pallet may be raised or lowered once loaded.

In accompanying FIGS. 2 through 8, there is shown the most preferred embodiment of a pallet nail press 10 according to this invention. Preferably, at the front of same, there is positioned an infeed conveyor 11 shown aligned to the left of the pallet nail press 10. That conveyor includes a pair of horizontally positioned, parallel spaced, guide tracks 12 on support frame 13. Continuous conveyor chains 14 are positioned on these guide tracks 12 and engaged overdrive sprocket assembly 15 having drive axle 16 and sprockets 17. The drive sprocket assembly 15 is powered by a motor 18 on a support bracket 18A as is known and understood by those skilled in the art.

A pallet stop assembly 21 is positioned between the terminal end of infeed conveyor 11 and a pallet press conveyor 20. That stop assembly 21 provides a restriction to maintain a pallet P1 or P2 on the infeed conveyor 11 while another pallet is being worked on in the pallet nail press 10. The indexing pin 21A of the stop assembly 21 raises and retracts via a piston and cylinder assembly engagement with each duly positioned pallet P1 or P2, as described hereafter.

In the first preferred embodiment, the pallet press conveyor 20 has spaced parallel tracks 20A and continuous conveyor chains 20B thereon for extending into and through the pallet nail press 10. A movable pallet indexing pin (not shown), similar to indexing pin 21, extends in the pallet nail press, between the pallet press conveyor 20, and operates in sequence with indexing pin 21 to stop and hold conveyed pallets in position for compression.

The pallet nail press 10 has a support frame defining pairs of spaced vertical support beams 23, 24 with respective upper 23A, 24A and lower cross supports 23B, 24B. The vertical support beams 23, 24 interconnect via the engaging longitudinal support beams 25 and 26, respectively. Pairs of air bags 27, 28 are positioned on the lower cross support 23B, 24B on circular mounts defined by upper and lower mounting plates 29, 30 for raising same in the general direction of raising arrow "R" in FIGS. 5 and 6A. For this first preferred embodiment, lift beams 31 and 32 are positioned across air bag pairs 27, 28, respectively.

Preferably, multiple hammer I-beams 34, 35, and 36 extend in a spaced, parallel relation between and on top of lift beams 31 and 32 completing the movable portion of this particular pallet nail press 10 embodiment. A plurality of safety stops 31A, 32A may extend from and secure to each vertical support pair 23B, 24B to prevent unrestricted vertical travel of hammer I-beams 34, 35 and 36, should a pallet be improperly and/or erroneously positioned in the press.

In contrast to the nail press of U.S. Pat. No. 5,375,315, among other changes, the prior system's plurality of stationary, anvil I-beams are replaced with anvils having a plurality of plate pairings 38A-38B, 39A-39B and 40A-40B, respectively (hereinafter referred to in combination as "38A/B", "39A/B" and "40A/B," respectively). As better seen in accompanying FIGS. 6A, 6B and 7, each pair of anvil plates are resiliently secured to and extends downwardly below and between upper support beams 23A and 24A. Each anvil plate pair also vertically aligns with a corresponding hammer I-beam, i.e. anvil plate pair 38A/B with I-beam 34, anvil plate pair 39A/B with I-beam 35, and anvil plate pair 40A/B with I-beam 36, as seen in accompanying FIGS. 1B, 2 and 3. Each resiliently suspended anvil pair also includes a front, center and rear segment for making firmer contact with the deck boards over the blocks of a properly positioned pallet in this press 10. Particularly, forward of anvil plate 38A, there is situated a firmly secured front-anvil segment F38. Intermediate anvils 38A and 38B, there is a firmly secure central-anvil segment C38, and rearward of anvil plate 38B, there is a firmly secured, trailing rear-anvil segment R38.

As shown in FIGS. 4, 6A, 6B and 7, these segments F38, C38 and R38 (hereinafter referred to in combination as "F/C/R38") are more fixedly mounted to an anvil support member 138 attached between the frame upper supports 23A, 24A, with the corresponding support beams for the other anvils being 139 and 140, respectively. It is to be understood, however, that for pallet type, other than the block-type pallets described above, these same anvil segments F/C/R38, F/C/R39 and F/C/R40 may be resiliently mounted, or the "floating" anvil plate pairs 38A/B, 39A/B and 40/A/B may be at least temporarily locked in place to their corresponding anvil support member 138, 139 and 140, respectively. Each of the anvil plate pairings and segments provide an impact surface for the top-deck panels of the pallet as will be discussed hereinafter.

Continuing to refer to FIGS. 4, 6A, 6B and 7, the resilient mounting of each anvil plate pair to its support structure can be accomplished with a series of anvil pair guide rods 38*r*, 39*r* and 40*r* (in registered alignment with mating cylindrical channels) and springs 38*s*, 39*s* and 40*s*. This rod and spring configuration provides registered alignment and variability in the exertion of force or pressures imparted on respective pallet locations therebeneath. Each spring 38*s*, 39*s* and 40*s* has a small, gas or hydraulic filled cylinder that can separately apply up to 1000 lbs. of spring force downward onto a properly positioned pallet being pressed by the hammer beams as previously described. In this preferred case, the spring is a common nitrogen gas filled spring, like those manufactured and sold by Dadco, Inc. (headquartered at 43850 Plymouth Oaks Blvd., Plymouth, Mich. 48170), although mechanical springs can be used, as well as other gas filled springs. Such variations in pressure, combined with each anvil plate to segment positioning, allows this pallet press 10 to accommodate for the slightest in pallet panel thicknesses, as well as adjustability of the compressed forces needed to consistently drive in, or press, all extended pallet fasteners.

In the preferred embodiment, the resiliency of the aforementioned anvil plates 38A/B, 39A/B and 40A/B is critical. Also, these resilient plates are preferably suspended below their correspondingly adjacent fixed anvil segments F/C/R38, F/C/R39 and F/C/R40, which are positioned at and above the respective pallet blocks B1, B2 and BC, as discussed above, to sufficiently accommodate different thicknesses of the top-deck panels, particularly between adjacent T1 and T2 panels or adjacent T3 and T4 panels, during refurbishing. It is important note the relative distance or thickness difference $d_2$ between the newly replaced T1 panel and the neighboring, preexisting T2 panel in FIG. 1C.

As previously stated, if these same T1 or T4 boards run slightly thicker than their neighboring pallet top-deck panels, for any of the several reasons discussed, there would be no resiliency in the fully-fixed, continuous anvil beam of the prior art. Without the "floating" anvil plate resiliency, the prior art press anvil beam might never contact the top surface to every top-deck panel. In the preferred embodiment, the relative distance between the lowermost plane (i.e. contact surface) of fixed anvil segment F38 and the lowermost plane to the immediately adjacent, resilient anvil plate 38A is shown as $d_3$ in accompanying FIG. 6B. It is most preferred that the relative distance between the planar, contact surfaces of the anvil plate and segments, $d_3$, be greater than the relative board thickness difference $d_2$ in FIG. 1C, i.e. greater than $1/16^{th}$-inch. In this manner, the preferred press of this invention will sufficiently compensate for differences in board thickness due to improper curing, thereby allowing substantially more of the pallet top-deck surface to be contacted with a compressing force for driving extended fasteners down and back into said top-deck surface.

By resiliently suspending the anvil plates below the fixed anvil beam segments, to be substantially aligned between adjacent block pairs for each set of longitudinally-extended blocks, the present invention will enable greater T2 and T3 board contacting when thicker T1 or T4 panels are present. With spring loading, as is preferred herein, these same "floating" anvil plates resiliently mounted to the corresponding anvil support member 138, 139 and 140 will be able to better provide resistance for pushing in any and all raised nail heads and stems, but not so hard as to possibly break one or more of the underlying pallet stringer boards SL, SM or SR.

Figure 8:
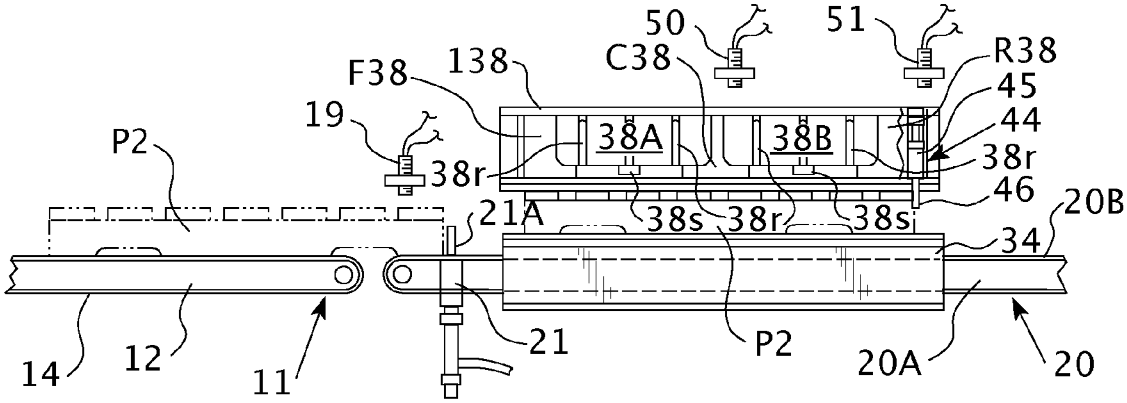
FIG. 8 is a simplified, elevational view showing the conveyor sequence as stringer-type pallets are conveyed into and compressed by the pallet nail press according to FIG. 2.

Preferably, at least two pallet exit stop pin assemblies 44 are spaced to be within the width of the standard pallet and secured to and extend downwardly from upper support beams 24A. FIG. 8 shows one of the laterally spaced pin assemblies 44. They provide for a positive stop and positioning of each pallet P1 or P2 in the nail press 10. Each exit stop pin assembly has a registration pin 46 in a guide sleeve 45 as a piston and cylinder assembly. Such a configuration allows for selective retraction and extension of said registration pin 46 from the guide sleeve.

Figure 7:
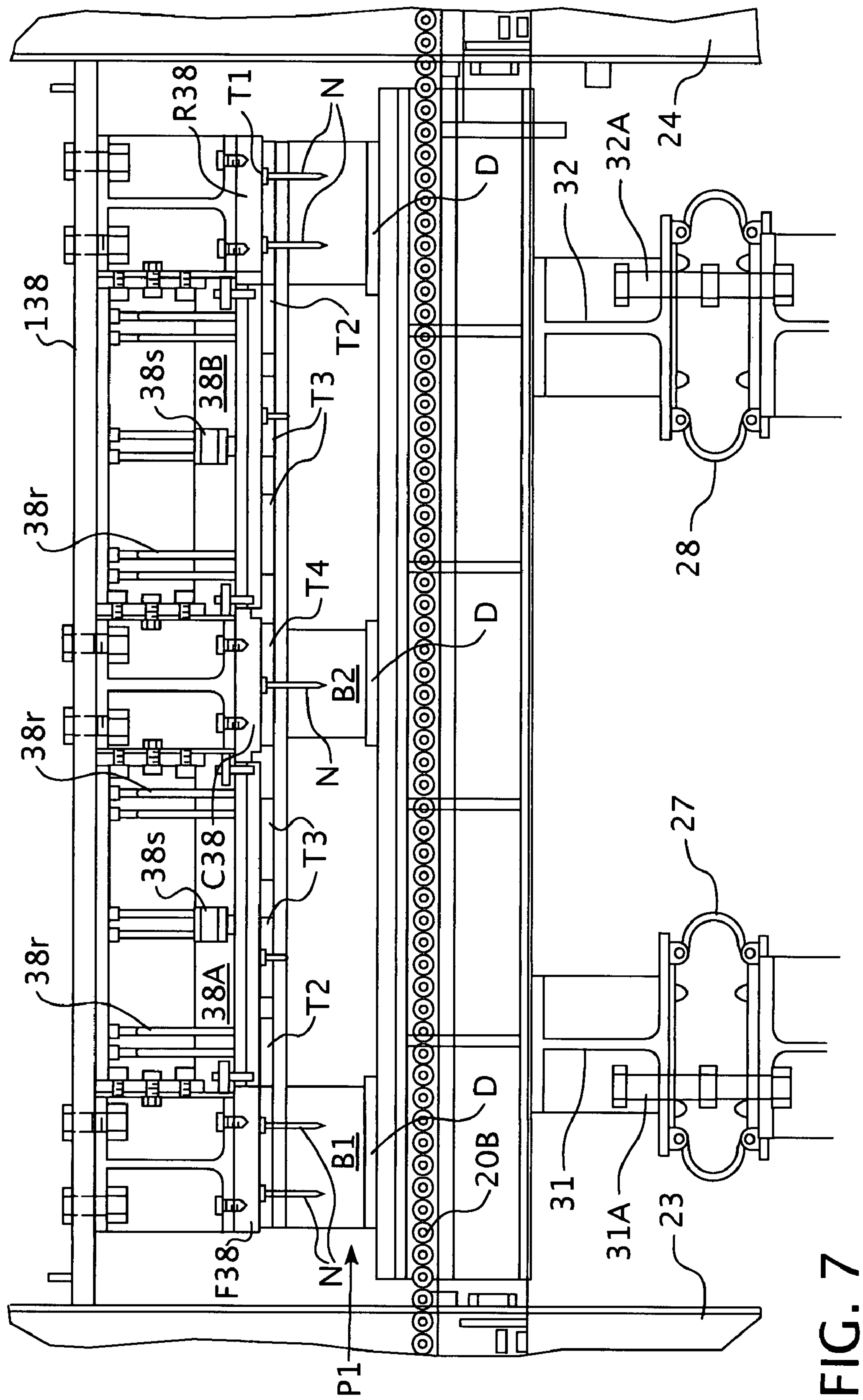
FIG. 7 is a cross-sectional view similar to FIG. 6A, but showing the nail press at full activation with a block-type pallet being compressed therewith.

In operation, a block-type pallet P1 is shown in cross-section entering the pallet nail press 10 at FIGS. 6A, 6B 7, and 8. It is detected by an electronic sensor 50 (best seen in FIG. 8). Via a control network of actuators known in the art, such sensing activates pallet exit stop pin assemblies 44 at the press exit to a down position and indexing pin 21A of the pallet stop assembly 21 at the press infeed to an up position. When that pallet P1 engages or is about to engage against exit stop pins 46, a secondary sensor 51 positioned adjacent the exit stop pin assemblies 44, activates inflation of air bag pairs 27 and 28 driving the multiple hammer beams upward, thereby lifting the pallet P1 away from its press conveyor 20 and against the respective longitudinally aligned, resiliently mounted anvil plate pairs 38A/B, 39A/B and 40A/B and fixed anvil segments F/C/R38, F/C/R39 and F/C/R40. As best seen in FIG. 7, the anvil plate pairs 38A/B, 39A/B and 40A/B retract upward under pressure, staying in registered guide alignment by way of guide rods 38*r*, 39*r* and 40*r*. Any outwardly extending nails N in the pallet P1 are then driven into the pallet's upper surface in one continuous motion against these anvil plate pairings and segments.

Once the upward cycle and compression of this press has been completed, air bags 27, 28 deflate, the hammer beams 34, 35 and 36 return, anvil plate pairs 38A/B, 39A/B and 40A/B return to the offset position (relative to the fixed anvil segments F/C/R38, F/C/R39 and F/C/R40) and registration pins 46 retract allowing the repaired pallet to once more engage with the pallet press conveyor 20 and exit the pallet nail press 10. After that first pallet has cleared electronic sensor 50, the retraction of indexing pin 21 is activated and the next pallet is conveyed into the press for repeating the aforementioned process step cycle. The entire cycle time is relatively short, i.e. about 3 to 4 seconds.

Figure 9:
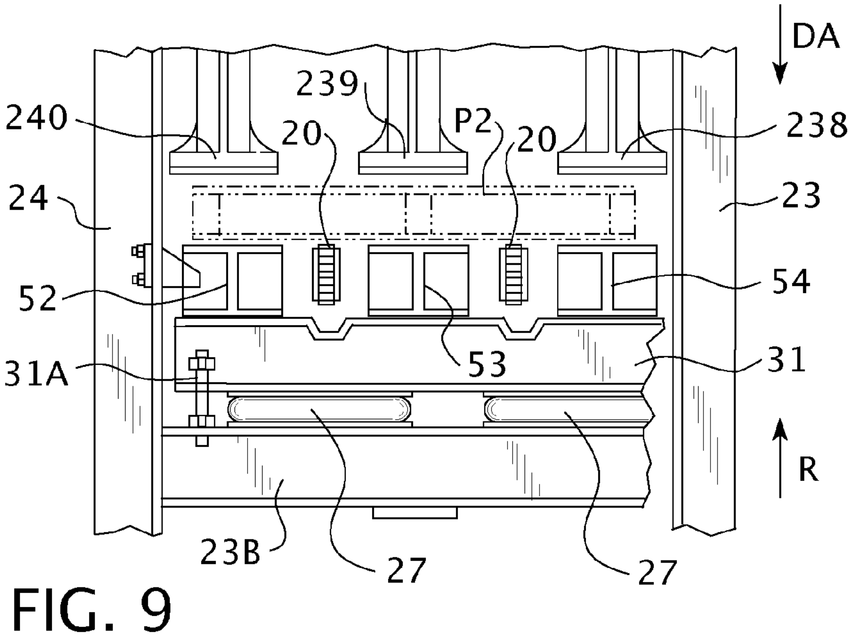
FIG. 9 is a front, elevational view of an alternative nail press in which both the hammer beams and anvil have the ability to make some vertical movement toward a pallet for compression therebetween.

Notably, FIG. 8 shows a first stringer-type pallet P2 in the preferred press according to the invention, and an upstream second pallet P2 on the adjoining conveyor awaits entry into the press for servicing therethrough. In FIG. 9, the stringer pallet P2 is positioned beneath an alternative embodiment of anvil beams 238, 239 and 240. As was discussed, for a typical stringer pallet, fewer fasteners work loose to outwardly extend beyond the uppermost pallet surface because longer nails can be used to fasten the deck boards to the length of the stringers ES-CS-ES disposed across the width of the P2 pallets. These side stringer boards ES, CS are thicker than the counterpart top stringer boards SL, SM, SR for a block pallet P1. As a consequence, the need for resiliently-mounted anvil plate pairings is less critical in a stringer pallet P2 refurbishment. Therefore, the anvil plate pairs of the press can be temporarily locked into a fixed position for stringer pallet repair.

Finally, it is important to note that accompanying FIG. 9 shows an alternative press configuration in which the anvil plate pairings and adjacent fixed segments can be designed for vertical movement up and down relative to the pressed pallet during each cycle. Notably, it is still necessary to separate each pallet from the conveyor 20 extending through the press so as to not damage the conveyor when the downward force is applied on the pallet. Preferably, the pallets are lifted in the direction of the raised arrow R by the hammer beams 52, 53 and 54, and held in place before resiliently mounted anvil beam structures 238, 239 and 249 (with plate pairings and segments previously described) being lowered in the direction of downward arrow DA for countersinking fasteners of each pallet passing through this alternate embodiment. Reciprocating upward and downward anvil beam movement may include the same mechanism, i.e. airbag inflation for lifting and deflation for dropping and compression, designed similarly to the type described and used for raising each pallet from the press conveyor. Further, with more sophisticated mechanics, the pallets may also be held fixed substantially in the same horizontal conveyorized plane, and the conveying 20 repeatedly lowered and raised thereabout.

Still further, the present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An apparatus for furbishing a pallet by embedding outwardly extended fasteners above a top surface formed by a plurality of top-deck pallet panels, the apparatus comprising:

a main support frame;

a plurality of anvil plates resiliently attached to said support frame, each anvil plate is located between anvil segments each anvil segment is longitudinally spaced to be vertically aligned above a block of said pallet for furbishing, and each anvil segment is fixedly attached to said support frame;

a hammer beam movably positioned within said frame and in vertically spaced alignment with said anvil plates and segments; and a mechanism for advancing the hammer beam toward the anvil segments and plurality of anvil plates for pressing outwardly extended fasteners against said anvil segments and resiliently attached anvil plates for embedding said fasteners in the top surface of said top-deck pallet panels.

2. The apparatus of claim 1, wherein each anvil plate can be locked into a fixed vertical position.

3. The apparatus of claim 1, wherein said furbished pallet having at least two sets of blocks, with each set in longitudinal alignment and spaced in substantially parallel space relationship from the other block set, each anvil plate being substantial parallel with one of the longitudinally aligned block sets fixed to said support frame.

4. The apparatus of claim 3, wherein said anvil plates are positioned substantially between block pairs of each longitudinally aligned block set.

5. The apparatus of claim 4, wherein the advancing mechanism includes:

i) an inflatable bag for moving said hammer beam towards said anvil plates and segments when said bag is inflated; and ii) a position switch for detecting a location of the pallet relative to the support frame to initiate inflation of said bag.

6. The apparatus of claim 5, wherein said advancing mechanism lifts the pallet towards the anvil plates and segments.

7. The apparatus of claim 5 further comprising a conveyor extending into said main support frame for transporting said pallet between said hammer beam and said anvil plates and segments.

8. The apparatus of claim 7 wherein said advancing mechanism lifts the pallet from the conveyor.

9. The apparatus of claim 3, wherein the advancing mechanism includes:

i) an inflatable bag for moving said hammer beam towards said anvil plates and segments when said bag is inflated; and ii) a position switch for detecting the position of the pallet relative to the support frame to initiate the inflation of said bag.

10. The apparatus of claim 9 wherein the advancing mechanism raises the pallet above a conveyor.

11. A press for furbishing a block-type pallet by embedding outwardly extending nails from an uppermost surface of said pallet, said press comprising:

a main support frame;

at least one anvil having an anvil support member secured to said main support frame, a plurality of anvil plates having a planar surface, each anvil plate having a compression spring for resilient attachment to said anvil support member, and a plurality of anvil segments fixedly attached from movement to said anvil support member, each fixed anvil segment is longitudinally spaced to be vertically aligned above a block of said pallet for furbishing, and each respective anvil plate being located between a pair of fixed anvil segments with each segment of said pair being at an opposite longitudinal end of said respective anvil plate;

a hammer beam movably positioned within said frame, the hammer beam being aligned with said anvil support member; and a mechanism for compressing said pallet between the hammer beam and anvil.

12. The press of claim 11, wherein said hammer beam advances the pallet upwardly toward the planar face of the anvil plates and fixed anvil segments, and each anvil plate being lockable into a fixed vertical position.

13. The press of claim 11, wherein each resilient plate is mounted to the anvil support member in substantially parallel alignment between a longitudinally aligned set of blocks of said pallet.

14. The press of claim 13, wherein each fixed segment being attached adjacent to at least one anvil plate substantially between block pairs of said longitudinally aligned set.

15. A method for furbishing a pallet to embed nails extending at least partially outward from an upper surface of the pallet, said method comprising the steps of:

transporting the pallet on a conveyor to a pallet nail press having a support frame and a plurality of laterally spaced hammer beams, each hammer beam being vertically aligned with an anvil having an anvil support, each anvil support having a plurality of anvil plates resiliently mounted to said support frame and a plurality of anvil segments fixedly attached from movement to said support frame and each anvil plate is longitudinally positioned between a pair of fixed anvil segments;

positioning said pallet between the hammer beam and anvil of the press with each anvil segment vertically aligned above a space block of said pallet:

lifting the pallet from the conveyor;

applying a force to the pallet with the hammer beam and anvil for embedding any nails extending outwardly above the pallet upper surface; and repositioning the pallet on the conveyor for exiting the press.

16. The method of claim 15, wherein said lifting step includes raising the pallet from the conveyor with the hammer beam.

17. The method of claim 15, wherein at least one of said resiliently mounted anvil plates can be locked into a fixed vertical position.

18. The method of claim 15, wherein said furbished pallet is a block-type pallet having at least two parallel sets of blocks longitudinally aligned and spaced across a width of the pallet, each resilient plate being mounted to the anvil support in substantial vertical alignment between one of said block sets.

* * * * *